July 7, 1970  A. H. BORST  3,518,947

GRIPPING LOCOMOTIVE FOR SUSPENDED RAILWAY

Filed Nov. 8, 1967  3 Sheets-Sheet 1

Inventor:
Adolf H. Borst
by
Edwin E. Greigg

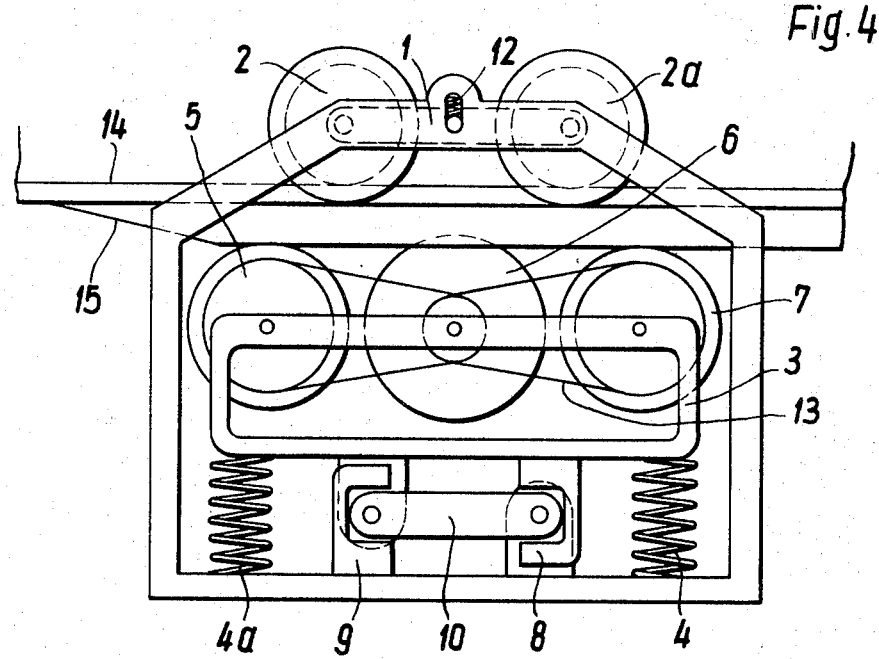
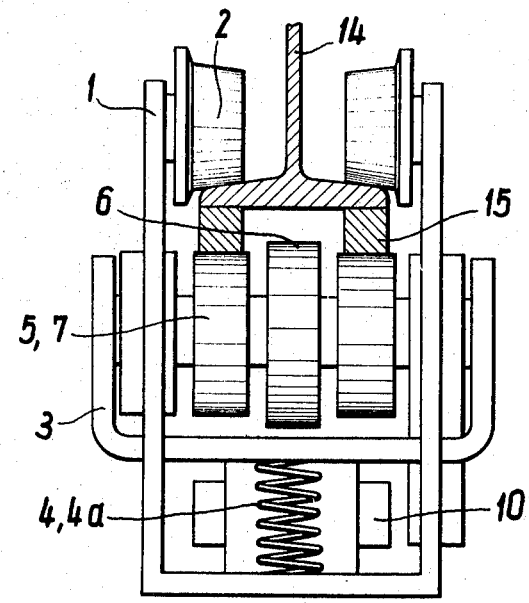

United States Patent Office 3,518,947
Patented July 7, 1970

3,518,947
GRIPPING LOCOMOTIVE FOR SUSPENDED RAILWAY
Adolf Hermann Borst, Alte Steige, Altenriet, Germany
Filed Nov. 8, 1967, Ser. No. 681,339
Claims priority, application Germany, Nov. 8, 1966,
B 89,728
Int. Cl. B61b 3/02, 13/06; B61c 13/08
U.S. Cl. 105—30                                    7 Claims

ABSTRACT OF THE DISCLOSURE

The invention relates to mechanism for suspension travel on a railway. The structure includes a group of drive rollers and is designed for high-speed travel by means of a medially disposed friction roller in the group in a horizontal plane on the railway and is arranged to be tilted when traveling in an inclined or vertical direction during which time its speed is reduced by reason of engagement of another in the group of friction rollers with the railway.

---

The invention relates to a travel-mechanism for an overhead railway, whose suspension frame has a suspension wheel running on a stationary suspension rail, and also a friction drive.

In general, where overhead railways are concerned, it is necessary to have a different drive moment for the friction drive, possibly also at a different travelling speed, for horizontal stretches of track on the one hand and for inclined and vertical stretches on the other. For this purpose it is known to arrange a torque converter between the drive motor and the friction wheel or wheels, which is controlled accordingly. This arrangement, however, requires comparatively great technical outlay, and it is the object of the present invention to reduce this.

This problem is solved in accordance with the invention by an arrangement in which at least two friction wheels driven by a common motor at approximately constant rotation speed of the same are provided, having differing peripheral speeds; and in which the suspension frame, under the influence of its specific weight as well as of the load weight, is arranged to have restricted movement in relation to the suspension wheels in such a way that on horizontal travel the friction wheel with high peripheral speed engages on the suspension rail and on inclined or vertical travel the friction wheel with low peripheral speed engages on the said suspension rail.

With the travel mechanism for overhead railways in accordance with the invention mechanism accordingly controls the necessary reversal of the friction wheels automatically and as a function of the load, load on transition from a horizontal or only slightly inclined stretch to a more sharply inclined or vertical stretch, and vice versa. Thereby the change in the drive moment in relation to the suspension rail as the result of a differing torque of the friction wheels is obtained in a way that is constructionally particularly simple and is completely sure in operation.

The invention will now be described with reference to the accompanying drawings, which show an embodiment of the invention but in no restrictive sense.

FIGURE 4 is a side view of the travel mechanism in horizontal travel, using specially constructed suspension rails;

FIGURE 5 is an end view of the travel mechanism of FIGURE 4.

Figure 1:
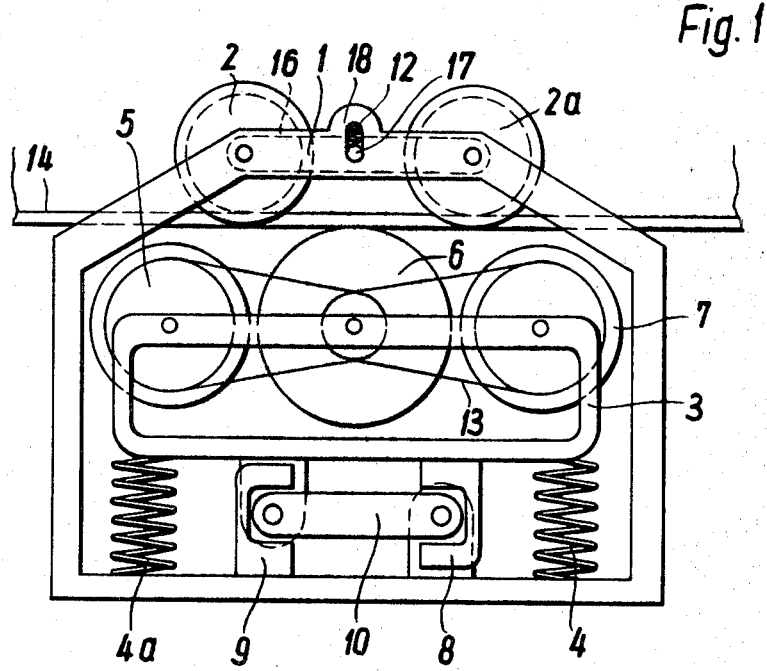
FIG. 1 is a side view of the travel mechanism of the invention in horizontal travel.

The travel mechanism for overhead railways in accordance with FIGURE 1 has a suspension frame 1, which through a pivot pin 17 and a slide 18 is connected pivotably with longitudinal struts 16 so as to have restricted movement, on which struts suspension wheels 2, 2a are carried, arranged in couples behind each other in the direction of travel. The said suspension wheels run on a stationary suspension rail 14.

A bearing frame 3 is arranged in the suspension frame 1, which abuts by means of springs 4, 4a on the said suspension frame 1 and is connected to the latter additionally through connecting link members 8, 9 and 10 in such a way that the bearing frame 3 has restricted movement in relation to the suspension frame 1.

In the bearing frame 3 are carried a drive motor, which is not shown in detail, and five friction wheels 5, 6 and 7. The friction wheel 6 arranged in the centre has a larger diameter than the remaining four friction wheels 5 and 7, which are arranged in pairs in the direction of travel in front of and behind the central friction wheel 6. As particularly well shown in FIG. 2, the frictional wheels 5 and 7 belonging to one particular pair are disposed on opposite sides of the vehicle plane.

The friction wheels 5, 6 and 7 are connected together by means of a belt or chain drive 13, the gearing being such that at the central friction wheel 6 there is comparatively great peripheral speed and accordingly a small torque, whereas the drive wheels 5 and 7 with considerably smaller periphery and the same rotation speed have a considerably greater torque.

Figure 2:
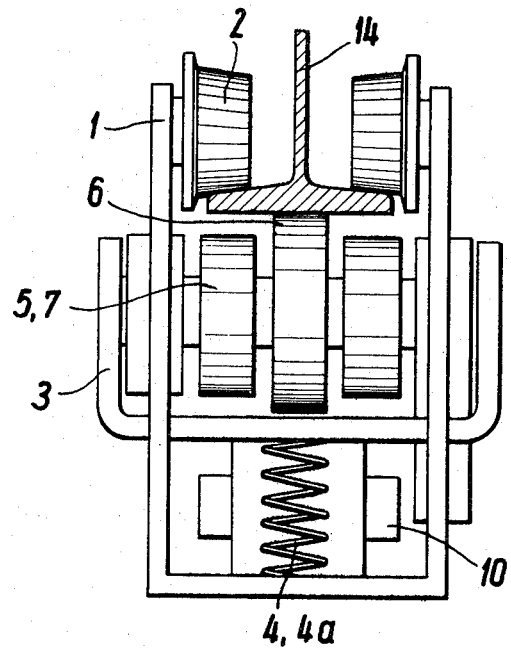
FIG. 2 is an end view of the travel mechanism.

In the position illustrated in FIGS. 1 and 2, i.e. horizontal travel of the travel mechanism, the suspension frame 1 is drawn upwardly by a spring 12 which acts between the longitudinal struts 16 and the suspension frame 1 and is indicated only diagrammatically. The bearing frame 3 of the friction drive is in this connection approximately parallel to the suspension rail 14. The central friction wheel 6 is in engagement with the suspension rail 14 and brings about the drive of the travel mechanism at small drive moment with comparatively great speed. The four friction wheels 5, 7 are not in engagement with the suspension rail 14.

Figure 3:
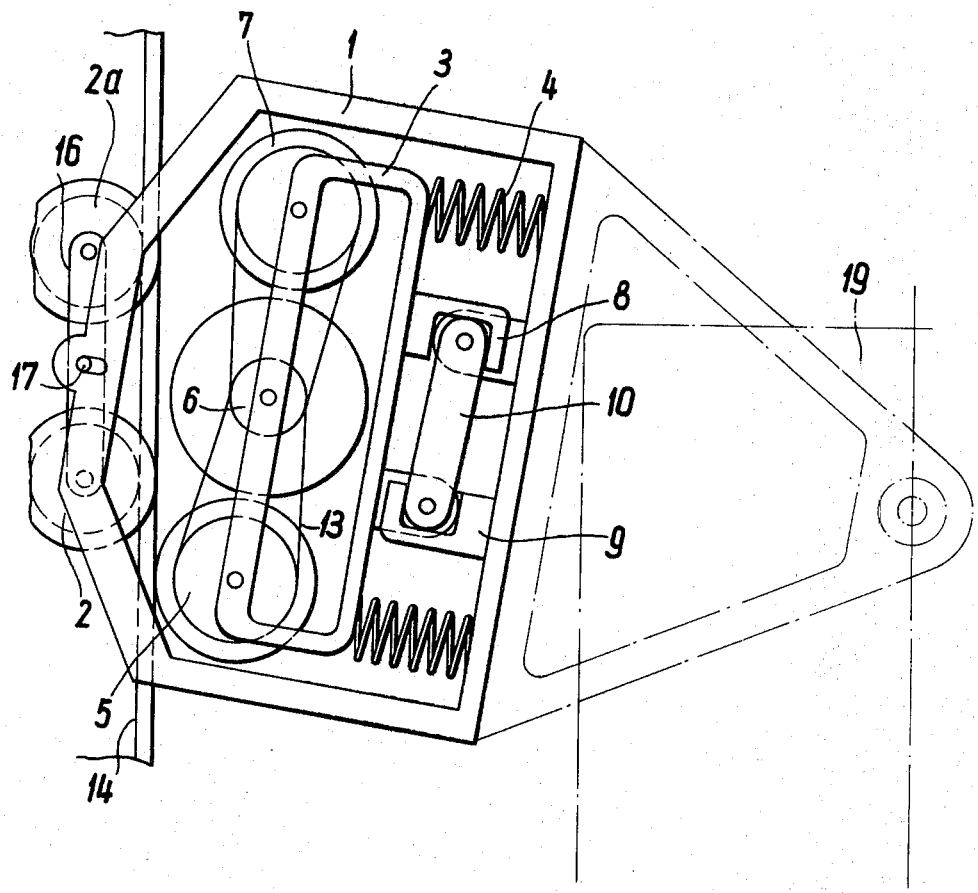
FIGURE 3 is a side view of the travel mechanism on vertical travel.

If the travel mechanism now runs from a horizontal stretch into a noticeably inclined or vertical stretch (see FIG. 3), the suspension frame 1, through the force of its specific weight as well as of the load weight 19, tilts about the pivot pin 17. Simultaneously it executes a relative movement in relation to the suspension wheels 2, 2a made possible by the slide 18, and in relation to the longitudinal struts 16 joining them. Thereby, as FIG. 3 shows, the central friction wheel 6 is lifted off the suspension rail 14, whereas the pair of small friction wheels 5 come into engagement with the suspension rail 14. The drive now takes place with greater drive moment and as a result with decreased speed.

If the travel mechanism again travels into a horizontal stretch, the suspension frame 1, automatically and as a function of the load, again returns to the position in accordance with FIG. 1.

As FIG. 3 shows, on travelling over a steeply inclined or a vertical stretch, always the pairs of friction wheels 5 or 7 placed underneath the central friction wheel 6 come into engagement with the suspension rail. The transition from a horizontal into an inclined or vertical stretch consists of a vertical outer bend of the suspension rail, the transition from a vertical into a horizontal stretch consists of a vertical inner bend, in accordance with whether the travel mechanism of the overhead railway is running outside or inside the bend.

In each position of the said travel mechanism the springs 4, 4a ensure a constant contact of the friction wheel 6 at the time active, or pair of friction wheels 5 or 7, on the suspension rail 14.

In FIGS. 4 and 5 a possible way is illustrated for reducing the speed of the travel mechanism without changes being made therein or in the drive in a horizontal stretch. For this purpose the drive rail 14 is provided on its underside with strips 15, which extend on both sides of the running surface of the central friction wheel 6 in the direction of travel and on which the small friction wheels 5 and 7 run, the bearing frame 3 of the friction drive being pressed downwardly against the force of the spring 4, 4a to such an extent that the central friction wheel 6 is out of engagement with the suspension rail 14 and the drive takes place merely through the small friction wheels 5 and 7.

In the embodiment illustrated, two smaller friction wheels are arranged in the direction of travel in front of and behind the central friction wheel 6. Instead of this of course in front of and behind the central friction wheel only a single friction wheel can be provided, running with greater torque and lesser peripheral speed, which single wheel advisably, in order to obtain the same or greater friction adhesion as with the large friction wheel, is of broader execution than the central friction wheel. Hereby the larger friction surface necessary for the transmission of the greater torque is obtained.

What I claim is:

1. A tiltable travel mechanism for overhead railways having a driving motor means therefor, the combination comprising, a suspension frame arranged to straddle and depend from the offstanding flanges of a suspension rail including upper and lower surfaces and having opposed pairs of wheels for travel on said upper surfaces of said flanges, a bearing frame having a plurality of driving means forming a cluster carried thereby positioned beneath said flanges with at least one of said cluster in engagement with the lower surface of the rail, said cluster having longitudinally spaced wheels of different diameters, link means connecting said suspension frame with said bearing frame, spring means disposed between the suspension frame and the bearing frame, with said link means permitting relative tilting movement between the suspension frame and the bearing frame so that any one of the cluster of driving means may engage the lower surface of the rail.

2. A travel mechanism for overhead railways as claimed in claim 1, wherein the opposed pairs of wheels arranged for travel on said railway are interconnected by a longitudinal strut means, said suspension frame being pivotally carried medially of said longitudinal strut means.

3. A travel mechanism for overhead railways as claimed in claim 2, wherein the longitudinal strut means and said suspension frame are interconnected by oppositely disposed pins on said strut means cooperating with slide means carried by said suspension frame.

4. A travel mechanism for overhead railways as claimed in claim 3, wherein resilient means are interposed between said pins on said strut means and the slide means carried by said suspension frame.

5. A travel mechanism for overhead railways as claimed in claim 1, wherein the medially disposed drive means carried by said bearing frame is of a larger diameter than the other of said plural drive means.

6. A travel mechanism for overhead railways as claimed in claim 5, wherein the other of said plural drive means comprise pairs of friction wheels disposed on opposite sides of a plane extending longitudinally of said suspension frame.

7. A travel mechanism for overhead railways as claimed in claim 6, wherein said pairs of friction wheels are in driving engagement with parallel longitudinally-extending means carried beneath the flanges of said suspension rail.

References Cited

UNITED STATES PATENTS

| | | | |
|---|---|---|---|
| 661,663 | 11/1900 | Kottgen | 105—29 |
| 1,759,177 | 5/1930 | Wehr | 105—30 |
| 2,228,034 | 1/1941 | Nelles | 105—30 |
| 3,074,354 | 1/1963 | Wakkila | 105—153 XR |
| 3,380,398 | 4/1968 | Wainwright et al. | 105—153 XR |
| 3,056,359 | 10/1962 | Fey | 105—30 X |
| 3,176,628 | 4/1965 | Reid | 105—73 |
| 3,261,303 | 7/1966 | Summers | 104—232 X |
| 3,267,876 | 8/1966 | Henderson | 104—232 X |

ARTHUR L. LA POINT, Primary Examiner

H. BELTRAN, Assistant Examiner

U.S. Cl. X.R.

104—95; 105—153, 154